United States Patent
Ditt et al.

(10) Patent No.: US 9,984,477 B2
(45) Date of Patent: May 29, 2018

(54) METHOD FOR DETERMINING A RESULTANT IMAGE, COMPUTER PROGRAM, MACHINE-READABLE DATA CARRIER AND IMAGING DEVICE

(71) Applicant: Siemens Aktiengesellschaft, München (DE)

(72) Inventors: Hendrik Ditt, Nuremberg (DE); Ernst Klotz, Uttenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 160 days.

(21) Appl. No.: 14/938,905

(22) Filed: Nov. 12, 2015

(65) Prior Publication Data
US 2016/0148379 A1 May 26, 2016

(30) Foreign Application Priority Data
Nov. 20, 2014 (DE) .......................... 10 2014 223 658

(51) Int. Cl.
*G06K 9/00* (2006.01)
*G06T 11/00* (2006.01)

(52) U.S. Cl.
CPC .......... *G06T 11/003* (2013.01); *G06T 11/008* (2013.01); *G06T 2211/412* (2013.01)

(58) Field of Classification Search
USPC ........ 382/100, 103, 106–107, 123–133, 154, 382/162, 168, 173, 181, 219, 232, 254,
(Continued)

(56) References Cited

U.S. PATENT DOCUMENTS 6,650,928 B1 * 11/2003 Gailly .................... A61B 6/032
128/922
2002/0114503 A1 8/2002 Klotz
(Continued)

FOREIGN PATENT DOCUMENTS

DE 102011006520 A1 10/2012
EP 1420367 A1 5/2004

OTHER PUBLICATIONS

German Office Action dated May 20, 2015.

*Primary Examiner* — Seyed Azarian
(74) *Attorney, Agent, or Firm* — Harness, Dickey & Pierce, P.L.C.

(57) ABSTRACT

In an embodiment of the invention, a plurality of images of a region under examination are recorded at different times. Anatomical information and flow information are derived from the images. The anatomical information may relate to the course of vessels or the structure of perfused tissue. The temporal component of the flow information can advantageously be combined with the anatomical information in a resultant image. An intensity-dependent fenestration assigns a gray-scale value to pixels of the resultant image in accordance with the anatomical information. A time-dependent fenestration assigns a chromaticity to the pixels of the resultant image in accordance with the flow information and the gray-scale values and the chromaticities are assigned independently of one another. Intensity-dependent fenestration is combined with time-dependent fenestration so that chromaticities and gray-scale values are independent of one another and the anatomical information and the flow information are depicted undistorted in the resultant image.

15 Claims, 3 Drawing Sheets

(58) Field of Classification Search
USPC ....... 382/274, 276, 286–291, 305, 312, 321; 378/4, 21; 604/503; 715/708; 606/130; 128/922; 600/424
See application file for complete search history.

(56) References Cited

U.S. PATENT DOCUMENTS

| | | | | |
|---|---|---|---|---|
| 2006/0067459 A1* | 3/2006 | Boese | ................... | A61B 5/0402 378/4 |
| 2013/0303888 A1* | 11/2013 | Deladi | ................... | A61B 5/066 600/424 |
| 2014/0128883 A1* | 5/2014 | Piron | ................... | A61B 8/0825 606/130 |
| 2014/0236118 A1* | 8/2014 | Unser | ...................... | A61B 8/06 604/503 |
| 2015/0089365 A1* | 3/2015 | Zhao | .................... | G06F 19/321 715/708 |

\* cited by examiner

METHOD FOR DETERMINING A RESULTANT IMAGE, COMPUTER PROGRAM, MACHINE-READABLE DATA CARRIER AND IMAGING DEVICE

PRIORITY STATEMENT

The present application hereby claims priority under 35 U.S.C. § 119 to German patent application number DE 102014223658.4 filed Nov. 20, 2014, the entire contents of which are hereby incorporated herein by reference.

FIELD

At least one embodiment of the invention generally relates to a method for determining a resultant image, a computer program, a machine-readable data carrier and/or an imaging device.

BACKGROUND

Imaging devices, such as an X-ray device or a tomographic device enable the recording of images of a region under examination at different times. A comparison of the images enables information with a temporal component to be derived from these images. The images generally represent a volume and can include a plurality of prespecifiable slices of the region under examination. If a substance flows through the region under examination, it is also possible to derive flow information from the images. Thus, modern imaging devices enable the identification of disorders of the blood flow in organs, for example the heart or the brain. The most important methods for imaging measurements of the blood flow include angiography and tomography perfusion scanning.

Therefore, the evaluation of the images requires the evaluation of both anatomical information and flow information. Anatomical information relates to the anatomical structure of the region under examination and hence has a spatial component. Flow information relates to the dynamics of a substance flowing in the region under examination and hence has both a spatial and a temporal component. The depiction of spatial and temporal information for an imaging measurement is typically performed in that an image stack with a plurality of slices is compiled for each time point. The spatial and temporal information can then be depicted in that individual slices or projections of the image stack are output as a temporally sequential sequence. Hence, this enables the evaluation of the temporal development of a substance flowing in the region under examination. However, this is time-consuming and above all disadvantageous for documentation.

To simplify the processing of spatial and temporal information, the U.S. Pat. No. 6,650,928 B1 suggests the conversion of tomographic images into color-coded maps. For example, two images of brain structures are overlaid. This involves the overlaying of a colored, parametric image over an anatomical image. The transparency of the overlaid image is adjustable to allow more or less of the anatomical structure to be seen. The drawback of this method is that good visibility of the anatomical information impairs the visibility of the parametric information.

SUMMARY

An embodiment of the invention discloses how flow information with a temporal component can be advantageously combined with anatomical information.

An embodiment of the invention is directed to a method. An embodiment of the invention is directed to a computer program. An embodiment of the invention is directed to a machine-readable data carrier. An embodiment of the invention is directed to an imaging device.

Any features, advantages or alternative embodiments can be transferred to the other claimed subject matter and vice versa. In other words, the subject-matter claims (which are, for example, directed toward a device) can also be developed with the features described or claimed in connection with a method. The corresponding functional features of the method are embodied by corresponding representational modules.

An embodiment of the invention is based on the recording of a plurality of images of a region under examination at different times. In addition, anatomical information and flow information are derived from the images. In particular, the anatomical information can relate to the course of vessels or the structure of perfused tissue. The inventors have now identified that the temporal component of the flow information can be advantageously combined with the anatomical information in a resultant image, wherein intensity-dependent fenestration can assign a gray-scale value to pixels of the resultant image in accordance with the anatomical information, wherein time-dependent fenestration assigns a chromaticity to the pixels of the resultant image in accordance with the flow information and wherein the gray-scale values and the chromaticities are assigned independently of one another.

An embodiment of the invention is directed to a method for determining a resultant image, comprising:

recording a plurality of images of a region under examination at different times;

deriving anatomical information from at least one of the plurality of images;

subsequently deriving flow information from the at least one of the plurality of images; and determining a resultant image, wherein an intensity-dependent fenestration assigns gray-scale values to pixels of the resultant image in accordance with the derived anatomical information, wherein a time-dependent fenestration assigns chromacities to the pixels in accordance with the derived flow information and wherein the gray-scale values and the chromacities are assigned independently of one another.

An embodiment of the invention also relates to a computer program with a program code for performing all method steps of an embodiment of the above-mentioned aspects of the invention when the computer program is executed in the computer. This enables the method to be executed reproducibly and with less susceptibility to error on different computers.

An embodiment of the invention also relates to a machine-readable data carrier on which the above-described computer program is stored.

An embodiment of the invention also relates to an imaging device with a computer for controlling the imaging device, wherein, by sending commands to the imaging device, the computer causes the imaging device to execute a method of the above-mentioned aspects of an embodiment of the invention.

The computer can also be embodied for controlling the imaging device such that, by sending commands to the imaging device, causes the tomography device to perform a method according to an embodiment of the invention.

An imaging device can be a magnetic resonance tomography device. In this case, the radiation comprises a radio-frequency alternating field in the radio-frequency range. In this case, the radiation source is at least one coil for generating the radio-frequency alternating field. In magnetic resonance tomography, the radiation detector is at least one coil for the detection of radio-frequency radiation.

BRIEF DESCRIPTION OF THE DRAWINGS

The following describes and explains the invention in more detail with reference to the example embodiments shown in the figures.

The figures show.

DETAILED DESCRIPTION OF THE EXAMPLE EMBODIMENTS

Figure 1:
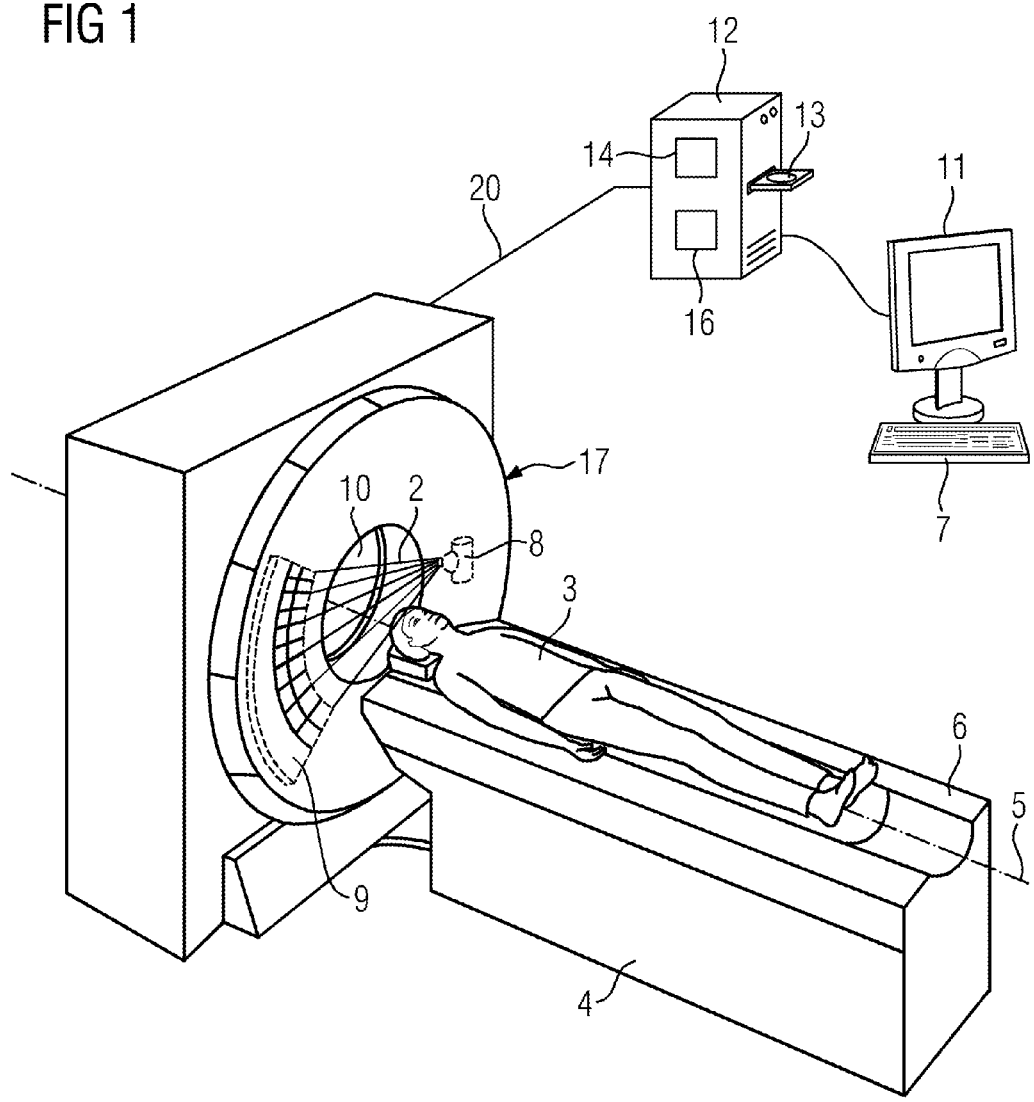
FIG. 1 an imaging device.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

An embodiment of the invention is based on the recording of a plurality of images of a region under examination at different times. In addition, anatomical information and flow information are derived from the images. In particular, the anatomical information can relate to the course of vessels or the structure of perfused tissue. The inventors have now identified that the temporal component of the flow information can be advantageously combined with the anatomical information in a resultant image, wherein intensity-dependent fenestration can assign a gray-scale value to pixels of the resultant image in accordance with the anatomical information, wherein time-dependent fenestration assigns a chromaticity to the pixels of the resultant image in accordance with the flow information and wherein the gray-scale values and the chromaticities are assigned independently of one another.

An advantage of an embodiment of the invention is justified in that intensity-dependent fenestration is combined with time-dependent fenestration so that chromaticities and gray-scale values are independent of one another. This is because this means that the intensity-dependent fenestration does not influence the time-dependent fenestration. This enables anatomical information and flow information to be displayed undistorted in the resultant image. The recording of the images is a physical measurement and the anatomical information and flow information derived are measuring results corresponding to a physical structure. Therefore, the invention has the technical effect that measuring results corresponding to a physical measurement can be combined with one another without the risk of distortion in a resultant image. Therefore, the resultant image according to the invention has a particularly high information content.

In this case, the anatomical information can be embodied as a spatial intensity distribution derived from at least one of the images. The flow information can be embodied as a distribution of flow values derived from the images. The flow values are, for example, a parameter characterizing a physical process, in particular a movement. The flow information is typically derived on the basis of a change in the distribution of intensity values of the images recorded at different times. In this case, the flow information can be determined such that a value of its own, in particular a flow value, is determined for each pixel of the resultant image.

If the region under examination is a body part or an organ of a patient, the flow information can be derived specifically for the patient. The resultant image then has a particularly high diagnostic value.

The independent assignment of gray-scale values and chromaticities can in particular include the independent assignment of gray-scale values and color shades since the color shade is particularly well suited to be perceived as information independent of the gray-scale value. The independent assignment can also be performed in that the chromaticity, in particular the color shade, is orthogonal to the gray-scale value. In this case, the time-dependent fenestration is based on a color space in which the chromaticity, in particular the color shade, and the gray-scale value are orthogonal to one another.

According to a further aspect of an embodiment of the invention, the recording of at least a part of the images is contrast-medium-supported. This enables the flow information also to include information on the inflow of contrast medium, in particular in a blood vessel. The images can then be recorded in the form of angiography images or tomography perfusion images so that it is particularly easy to derive flow information relating to the blood flow in the region under examination.

According to a further aspect of an embodiment of the invention, the anatomical information is derived in that a first projection takes place via a plurality of the images recorded at different times. Therefore, the first projection at least takes place along the time axis. For example, a particularly large number of measuring points is taken into account during the first derivation of the anatomical information. This means the information content of the resultant image is particularly high. It is also possible to increase reliability during a further analysis on the basis of the resultant image.

According to a further aspect of an embodiment of the invention, the flow information is derived on the basis of a physical model. For example, the physical model can describe the propagation of blood in a blood vessel or the propagation of blood in a tissue. In particular, the tissue can be highly capillarized. The physical model can also describe the propagation of a substance by diffusion. This aspect of the invention enables the flow information to be determined particularly accurately.

In addition to the chromaticity, a color possesses the properties of luminance and color saturation. A color can be depicted in different color spaces such as, for example, the red-green-blue (RGB) color space, the L*a*b color space, the CIE standard color table or the HSV (hue, saturation, value) color space. The axes, which span a color space, can also be generally described as channels of a color space. With temporal fenestration, in particular a color shade can correspond directly to flow information. In order to ensure that the information content of the resultant image is particularly high and both the anatomical information and the flow information are reproduced undistorted, it is also possible to place requirements on the luminance or color saturation.

According to a further aspect of an embodiment of the invention, time-dependent fenestration is performed such that a maximum luminance of the chromaticities for the pixels is the same. Since the luminance corresponds to a gray-scale value, this means that the maximum gray-scale value for the pixels is also the same. This excludes the possibility of pixels to which different chromaticities and the same gray-scale values are assigned nevertheless having different luminance values or gray-scale values. This in particular enables intensity-dependent fenestration to be performed in effect linearly, that is also taking account of the time-dependent fenestration.

According to a further aspect of an embodiment of the invention, time-dependent fenestration is performed such that the maximum color saturation for the pixels is the same. For example, the color saturation can be determined in the CIE standard color table as a relative distance from the neutral point. In the HSV color space, color saturation is treated as one of the three spanning axes. If the maximum color saturation for the pixels is now the same, the assignment of the gray-scale values changes the corresponding chromaticities in a similar and regular way.

According to a further aspect of an embodiment of the invention, the gray scale for the intensity-dependent fenestration and/or the color scale for the time-dependent fenestration can be prespecified. This makes the invention particularly flexible. For example, the maximum luminance of the chromaticities or the maximum color saturation can be prespecified. In particular, the gray scale and/or the color scale can be selected by a user, for example by means of a graphical user interface.

According to a further aspect of an embodiment of the invention, the graphical output of the resultant image is depicted on a display unit, wherein a section of the resultant image can be selected, wherein the gray scale and/or the color scale are dependent upon the section selected. For example, the gray scale can be adjusted to the anatomical information derived for the section or the color scale to the flow information derived for the section. To this end, the contrast of the section is increased which facilitates the further analysis of this section.

The images can in principle be either two-dimensional projections or image stacks calculated from tomographic recordings with a plurality of slices. An image of this kind recorded at a time point can also be described as a spatially three-dimensional image. The sectional planes for calculating the individual slices of the image stack can in principle be freely selectable. The images recorded and the resultant image can have the same spatial dimensions. However, the images recorded and the resultant image can have different spatial dimensions. With a particularly important aspect of the invention, the images are each spatially three-dimensional images, wherein the anatomical information and the flow information are both embodied as spatially three-dimensional and wherein the resultant image is a spatially two-dimensional image.

According to this aspect of an embodiment of the invention, intensity-dependent fenestration is performed such that the gray-scale values are assigned to the pixels in accordance with the anatomical information projected along a spatial direction, wherein the time-dependent fenestration is performed such that the chromaticities are assigned to the pixels in accordance with the blood flow information projected along the spatial direction. The spatial direction can be freely selectable or it can also be prespecified by a preferred axis of the region under examination. In particular, the spatial direction can be a body axis of the patient, for example perpendicular to the sagittal plane, perpendicular to the frontal plane or perpendicular to the transversal plane. This enables the combination of a particularly large amount of spatial and temporal information in the resultant image.

An embodiment of the invention also relates to a computer program with a program code for performing all method steps of an embodiment of the above-mentioned aspects of the invention when the computer program is executed in the computer. This enables the method to be executed reproducibly and with less susceptibility to error on different computers.

An embodiment of the invention also relates to a machine-readable data carrier on which the above-described computer program is stored.

An embodiment of the invention also relates to an imaging device with a computer for controlling the imaging device, wherein, by sending commands to the imaging device, the computer causes the imaging device to execute a method of the above-mentioned aspects of an embodiment of the invention.

The computer can also be embodied for controlling the imaging device such that, by sending commands to the imaging device, causes the tomography device to perform a method according to an embodiment of the invention.

An imaging device can be a magnetic resonance tomography device. In this case, the radiation comprises a radio-frequency alternating field in the radio-frequency range. In this case, the radiation source is at least one coil for generating the radio-frequency alternating field. In magnetic resonance tomography, the radiation detector is at least one coil for the detection of radio-frequency radiation.

The imaging device can also be an X-ray device which is configured to record a plurality of X-ray projections from different projection angles. For example, an X-ray device of this kind is a computer tomography device with an annular rotating frame or a C-arm X-ray device. The recordings can be generating during a, in particular continuous, rotational movement of a recording unit with an X-ray source and an X-ray detector interacting with the X-ray source. The X-ray source can in particular be an X-ray tube with a rotary anode. An X-ray detector for a computer tomography device is, for example, a line detector with a plurality of lines. An X-ray detector for a C-arm X-ray device is, for example, a flat detector. The X-ray detector can be embodied as both energy-resolving and metering.

FIG. 1 shows an imaging device using the example of a computed tomography device. The computed tomography device shown has a recording unit 17 comprising a radiation source 8 in the form of an X-ray source and a radiation detector 9 in the form of an X-ray detector. During the recording of X-ray projections, the recording unit 17 rotates about a system axis 5 and, during the recording, the X-ray source emits rays 2 in the form of X-rays. In the example shown here, the X-ray source is an X-ray tube. In the example shown here, the X-ray detector is a line detector with a plurality of lines.

In the example shown here, during the recording of projections, a patient 3 lies on a patient bed 6. The patient bed 6 is connected to a bed base 4 such that the base bears the patient bed 6 with the patient 3. The patient bed 6 is designed to move the patient 3 along a recording direction through the opening 10 in the recording unit 17. The recording direction is as a rule determined by the system axis 5 about which the recording unit 17 rotates during the recording of X-ray projections. In the case of a spiral recording, the patient bed 6 is moved continuously through the opening 10 while the recording unit 17 rotates about the patient 3 and records X-ray projections. As a result, the X-rays describe a spiral on the surface of the patient 3.

In addition, a tomographic device can also have a contrast-medium injector for the injection of contrast medium into the blood circulation of the patient 3. This enables the images to be recorded with contrast-medium support such that structures located in the region under examination, in particular blood vessels, can be depicted with enhanced contrast. The contrast-medium injector also provides the option of actuating angiography recordings or performing perfusion scanning. Contrast media should be generally understood to mean media that improve the depiction of body structures and functions during the imaging method. For the purposes of the present application, contrast media should be understood to be both conventional contrast media, such as, for example, iodine or gadolinium, and tracers, such as, for example. 18F, 11C, 15O or 13N.

The imaging device shown here comprises a computer 12 connected to a display unit 11 and an input unit 7. The display unit 11 can, for example, be an LCD, plasma or OLED screen. It can also be a touch-sensitive screen which is also embodied as an input unit 7. A touch-sensitive screen of this kind can be integrated in the imaging device or embodied as part of a mobile device. The display unit 11 is suitable for inventive graphical output OUT of the resultant image. The input unit 7 is, for example, a keyboard, a mouse, a so-called "touch screen" or even a microphone for voice input. The input unit 7 is also suitable to select a section of the resultant image output on the display unit 11.

The computer 12 comprises a reconstruction unit 14 for the reconstruction of an image from raw data. For example, the reconstruction unit 14 can reconstruct a tomographic image in the form of an image stack with a plurality of slices. The imaging device can also have a computing unit 15. The computing unit 15 can interact with a computer-readable data carrier 13, in particular in order to carry out a method according to the invention by means of a computer program with a program code. The computer program can also be stored in retrievable form on the machine-readable carrier. In particular, the machine-readable carrier can be a CD, DVD, blu-ray disk, a memory stick or a hard disk. Both the computing unit 15 and the reconstruction unit 14 can be embodied in the form of hardware or in the form of software. For example, the computing unit 15 or the reconstruction unit 14 is embodied as a so-called FPGA ("field programmable gate array") or comprises an arithmetic logic unit.

In the embodiment shown here, at least one computer program is stored on the memory of the computers 12, wherein this program carries out all the method steps of the method according to the invention when the computer program is executed on the computer 12. The computer program for executing the method steps of the method according to the invention comprises a program code. The computer program can also be embodied as an executable file and/or on another computing system instead of the computer 12. For example, the imaging device can be designed such that the computer 12 loads the computer program for the execution of the method according to the invention into its internal working memory via an intranet or the internet.

Figure 2:
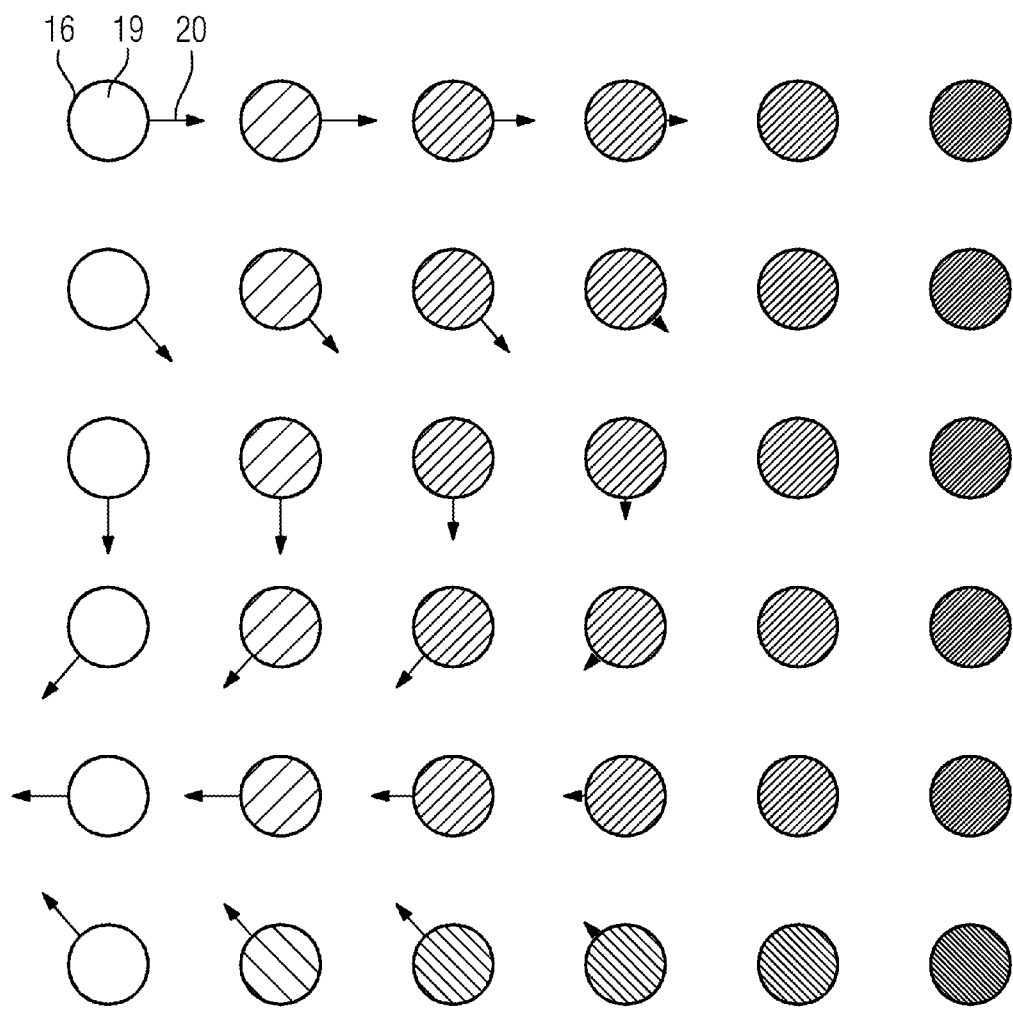
FIG. 2 a schematic view of a resultant image with individual pixels.

FIG. 2 shows a schematic view of a resultant image with individual pixels. In the example shown here, the circles each depict a pixel 16 of the resultant image. The pixels 16 can be both pixels and voxels. Here, 'pixels' designates pixels 16 of a spatially two-dimensional image, 'voxels' designates the pixels 16 of a spatially three-dimensional image. The images for the determination of the resultant image can be recorded with a tomography device described in FIG. 1 and output graphically on the display unit 11.

The filling of the individual circles indicates the gray-scale value assigned to a pixel 16 by intensity-dependent fenestration. In the method according to the invention, this gray-scale value also corresponds to the luminance 19 assumed by the chromaticity of a specific resultant image. Accordingly, in the resultant image shown here, the luminance 19 falls going from left to right. In addition, all the pixels 16 in one column are of equal luminance. The directions of the arrows 20 associated with the circles each indicate the chromaticity. For example, the color scale for time-dependent fenestration is based on the rainbow scale. Accordingly, an arrow 20 oriented toward the right can correspond to a red shade, an arrow 20 oriented downward to a green shade and a 20 arrow oriented toward the left to a blue shade. Therefore, in the example shown here, a rainbow scale is scanned from top to bottom. In the example shown here, the maximum luminance is the same for all chromaticities. In this example, the maximum luminance is indicated by a white-filled circle. The lengths of the arrows 20 indicate the degree of the color saturation in each case. A longer arrow 20 corresponds to stronger color saturation. In the example shown here, the color scale is selected such that there is a direct relationship between the color saturation and the luminance 19, at least for the pixels 19 to which a colorful color shade is assigned. Desaturation takes place from left to right wherein the desaturation takes the form of an increasing proportion of black. I.e. a white-filled circle corresponds to a pixel 6 to which maximum saturation has been assigned. On the other hand, a white-filled circle corresponds to a pixel 16 to which minimum saturation has been assigned so that the corresponding pixel 16 appears black. Therefore, in certain embodiments of the invention, the color saturation can be determined as a function of the luminance 19 or of the assigned grey-scale value. In the example shown here, there is complete desaturation with a normalized luminance 19 of greater than zero. In another example (not shown here,) desaturation takes place by means of an increasing proportion of white.

Intensity-dependent fenestration is performed in accordance with the anatomical information. The anatomical information can in particular be described by an intensity distribution. The anatomical information and hence also an intensity distribution can be derived with known image processing methods from at least one of the images recorded. For example, the first derivation of the anatomical information includes filtering or segmentation of at least one of the images recorded. The anatomical information can also be described in a slice image of a region under examination reconstructed from a tomography recording from the distribution from intensity values in Hounsfield units. Intensity-dependent fenestration can be described by the expression shown below for 1(c), wherein c indicates the intensity in Hounsfield units and c_max and c_min respectively the maximum and the minimum intensity within the intensity distribution in Hounsfield units. I designates the assigning gray-scale value, I_max and I_min respectively designate the maximum and minimum gray-scale values that can be assigned to a pixel 16 with intensity-dependent fenestration. For example, I_min=0 and I_max=255 is possible.

$$I(c) = \begin{cases} I\_min & c \leq c\_min \\ I\_min + (I\_max - I\_min) * (c - c\_min)/(c\_max - c\_min) \\ I\_max & c \geq c\_max \end{cases}$$

Time-dependent fenestration is performed in accordance with flow information. The flow information is derived from the images, in particular, the flow information can be derived from changes in a distribution of intensity values between images recorded at different time points. In this context, the flow information has a temporal component. For example, the flow information can be information relating to the blood flow. In particular, this can be the blood volume, the average flow rate through a volume within the region under examination and the delay time until the maximum inflow of contrast medium in the region under examination. In different embodiments of the invention, the flow information can relate to both a directed flow and an undirected flow. In one embodiment of the invention, the flow information is diffusion parameters in the region under examination. The diffusion parameters usually relate to the diffusion of water and can in particular be derived on the basis of diffusion tensor imaging.

The flow information can relate directly to a temporal value or the flow information is derived on the basis of a time-dependent phenomenon. For example, rates or diffusion Parameters are derived from a time-dependent phenomenon, namely from a movement. The flow information can naturally also have spatial component in that it corresponds to a spatial distribution. The time-dependent fenestration causes scaling of the flow information on the basis of the time-dependent component. For example, the time-dependent fenestration can be described by the expression shown below for L(t), wherein t specifies a through-flow time and t_max and t_min the respective maximum and minimum through-flow times. L designates the assigning chromaticity, L_max and L_min designate the respective maximum and minimum chromaticity within a color scale which can be assigned to a pixel 16 during intensity-dependent fenestration.

$$L(t) = \begin{cases} 1 & t \leq t\_min \\ 1 + (L\_max - 1) * (t - t\_min)/(t\_max - t\_min) \\ L\_max & t \geq t\_max \end{cases}$$

During temporal fenestration, it is also possible to label the pixels 16 to which no valid flow information can be assigned. For example, there cannot be any valid flow information if the noise in the respective pixel 16 exceeds a limit value. The labeling can be performed such that the pixels 16 to which no valid flow information can be assigned are assigned no chromaticity or the chromaticity "white". In such a case, L=0 can be selected. In this context, the time-dependent fenestration can include labeling.

It is generally applicable that a chromaticity can be assigned in that a pixel 16 is assigned at least one value of one channel of a color space. For example, the chromaticity can be assigned in that the channel 'Hue' in the HSV color space is assigned a value. It is also possible for the chromaticity to be assigned in that the channels 'Red', 'Green', 'Blue' of the RGB color space are each assigned a value. In different embodiments of the invention, the time-dependent fenestration includes a value being assigned to a pixel 16 for each channel of a color space. In addition, the chromaticities can also be described in a normalized form. If the RGB color space is selected without restricting the generality, the normalized chromaticity is expressed as:

$$FW\_norm(i) = \frac{\{r\_i, g\_i, b\_i\}}{3 * \max(r\_i, g\_i, b\_i)}$$

Here, FW_norm(i) designates the normalized chromaticity. r_i, g_i and b_i designate the values of the channels 'Red', 'Green' and 'Blue'. Here, i specifies the index of the color space, for example, i can be between 0 and 255 with a color space with 255 color shades. The function max(r_i, g_i, b_i) specifies the maximum value of the three channels for the index i. In one embodiment of the invention, the time-dependent fenestration is such that the maximum luminance 19 of the chromaticities for the pixels 16 is the same. In the RGB color space, the luminance 19 is specified by H(i)=r_i+g_i+b_i, wherein H designates the luminance 19. It is now therefore possible to select the color scale such that the maximum luminance 19 is the same for all the assigned chromaticities. In particular, the maximum normalized luminance 19 of the chromaticities for the pixels 16 can be the same. In the RGB color space, the normalized, maximum luminance of the chromaticities is specified by the following expression:

$$L\_max(FW\_norm(i)) = \frac{r\_i + g\_i + b\_i}{3 * \max(r\_i, g\_i, b\_i)}$$

Here, L_max designates the normalized, maximum luminance which can assume different values in different embodiments of the invention. For example, the condition L_max=1 or L_max=0.5 can be fulfilled.

It is now possible to combine the intensity-dependent and the time-dependent fenestration with one another. In the example of the RGB color space, the combined fenestration is then specified by the following expression:

$$\{R, G, B\}\_l, m = \begin{cases} I(MC\_l, m) * \{1, 1, 1\}/3 & wenn\ L(t\_l, m) = 0 \\ I(MC\_l, m) * FW\_norm(L(t\_l, m)) \end{cases}$$

In this case, l and m represent the two-dimensional position of the relevant pixel 16 in the resultant image, which comprises l lines and m columns. In this example, t_l,m designates the flow information in the form of a through-flow time assigned to a pixel 16. MC_l,m designate the distribution of the anatomical information determined, for example, by a projection of the maximum intensity beyond the times of the images recorded. * designates a multiplication. The expression {1,1,1} is a unit vector in the RGB color space. The unit vector of the respective color space used can be used in further embodiments of the invention.

The gray-scale value I can therefore be dependent on the distribution of the anatomical information. The color space can, as described here by way of example, be constructed such that the gray-scale value for pixels of the resultant image, to which no chromaticity, in particular no colorful chromaticity, is assigned is multiplied with the unit vector of the color space, the gray-scale value for pixels of the resultant image, to which a chromaticity, in particular a colorful chromaticity, is assigned, is multiplied with the respective, normalized chromaticity assigned.

Therefore, the gray-scale value and chromaticity are independent of one another in such a color space. Hence, the color space can also be constructed such that the gray-scale value and chromaticity are orthogonal to one another. The color space can also be constructed such that it does not include the chromaticities "white" and "black", but only colorful colors.

Figure 3:
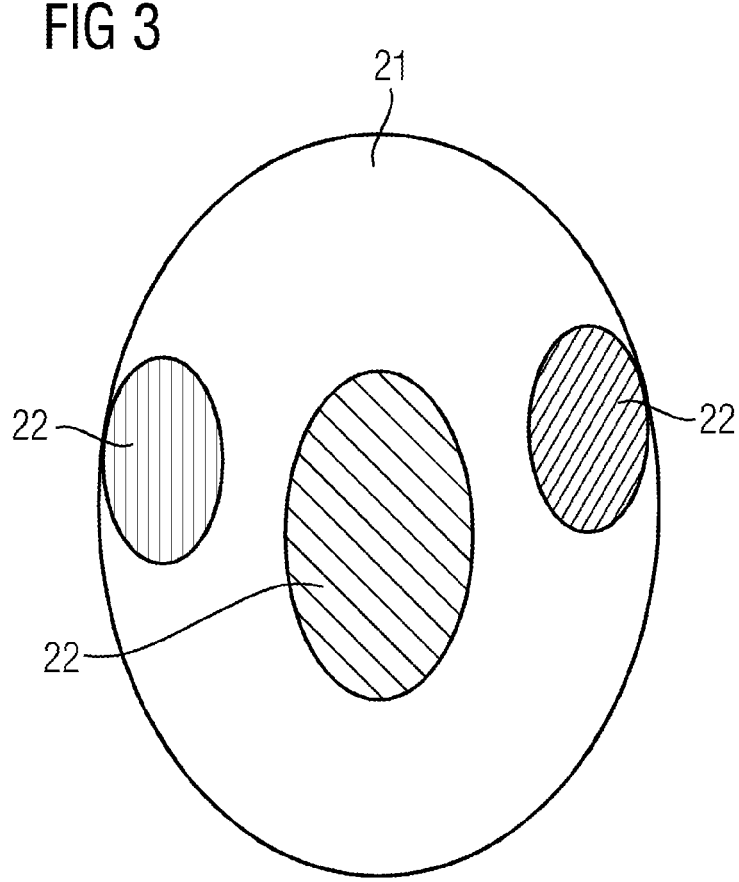
FIG. 3 a schematic view of a resultant image with different regions.

FIG. 3 is a schematic view of a resultant image with different regions. In the example shown here, the resultant image shown in the schematic view is a two-dimensional image of a brain of a patient 3. This shows a projection of the brain along the long body axis of the patient 3 so that the front side in FIG. 3 points upward. FIG. 3 is drawn in strongly schematic form and does not show any anatomical details. The first region 21 of the resultant image is characterized in that no chromaticity is assigned to the pixels 16 in the first region 21 or the chromaticity is equal to zero. For example, the first region 21 can be further characterized in that that the flow information, in particular its temporal component, cannot be determined with a specific accuracy. Therefore, it may be advisable also not to assign any chromaticity to certain pixels 16 during time-dependent fenestration when the expected error in the chromaticity exceeds a limit value. For example, the expected error can be high due to a high noise level in the images recorded. In the example shown here, there are no large blood vessels in the first region 21 so that, with images recorded with contrast medium, the measurable intensity in the images is too low for the temporal information to be derived with a high degree of accuracy. On the other hand, in the second region 22, a chromaticity is assigned to each of the pixels 16 by the time-dependent fenestration. This is because, the expected chromaticity error in the second region 22 is below a limit value. In the example shown here, there are large blood vessels in the second region 22 so that, with images recorded with contrast medium, the measurable intensity in the images is sufficient for the temporal information to be derived with a high degree of accuracy. For purposes of clarity, the second region 22 in FIG. 3 is shown with hatching and the first region 21 is depicted in FIG. 3 in a uniform gray-scale value. In FIG. 3, the different chromaticities in the second region 22 are indicated by the orientation of the hatching. The luminance of the respective chromaticity is depicted by the density of the hatching. In the example shown, the flow information is the arrival time of a contrast medium.

Figure 4:
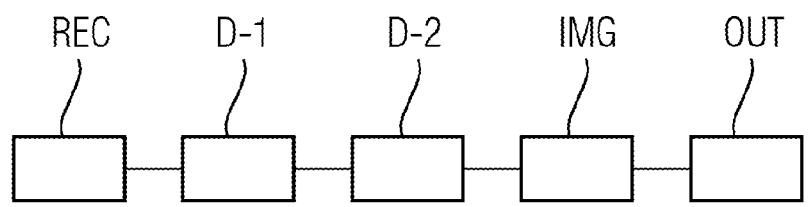
FIG. 4 a flow diagram of a method according to an embodiment of the invention.

FIG. 4 is a flow diagram of a method according to the invention. The recording RED of a plurality of images of a region under examination at different times is performed by an imaging device. In this case, the images can be recorded with an identical or variable temporal interval. In particular, it is of advantage for the derivation of perfusion parameters for a plurality of images with an identical temporal interval to be recorded. The first derivation D-1 of anatomical information from at least one of the images and the second derivation D-2 of flow information from the images can be supported by a computer 12 and take place automatically. The method depicted here also includes the step of the determination IMG of a resultant image, wherein an intensity-dependent fenestration assigns pixels 16 of the resultant image gray-scale values in accordance with the anatomical information, wherein a time-dependent fenestration assigns the pixels 16 chromaticities in accordance with the flow information and wherein the gray-scale values and the chromaticities are assigned independently of one another. The method shown here also includes the step of the graphical output OUT of the resultant image on a display unit 11, wherein a section of the resultant image can be selected, wherein the gray scale and/or the color scale are dependent upon the selected section.

In a further embodiment of the invention, the flow information is derived on the basis of a physical model. The flow information can in particular be derived such that in particular a flow value is determined for each pixel of the resultant image based on the physical model. A model of this kind can in particular model the flow of a substance and at the same time also take account of properties of the substance and a structure limiting the flowing substance. For example, the model can model the blood flow in a blood vessel or in tissue penetrated by blood vessels. The flow information can also be derived on the basis of a physical model such that the model can be adapted to the change in the distribution of intensity values. The adaptation can in particular take place by the interpolation of intensity values at different times. In this case, a parameter can be adapted to the change in the distribution of intensity values, in particular a parameter characterizing a physical process. It is also possible for the change in the distribution of intensity values to be interpolated.

The flow information can also be derived on the basis of a physical model such that a simulation is performed. For example, this is a numerical simulation, which can also be embodied as a flow simulation. A flow simulation of this kind can in particular be embodied in the form of a so-called CFD simulation (CFD is an abbreviation for computational fluid dynamics). The flow simulation can also be based on or more anatomical parameters, which are derived from at least one of the images recorded at different times. The anatomical parameter can, for example, be the diameter of a blood vessel. The enables the flow information to be determined particularly accurately on the one hand and yet patient-specifically on the other.

The aforementioned description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure and appended claims.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one embodiment of the invention relates to a non-transitory computer-readable storage medium comprising electronically readable control information stored thereon, configured in such that when the storage medium is used in a controller of a magnetic resonance device, at least one embodiment of the method is carried out.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a flu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Flu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for determining and outputting a resultant image, comprising:
controlling at least one imaging device to record a plurality of images of a region under examination at different times, wherein the at least one imaging device comprises at least one of a magnetic resonance imaging (MRI) device, a computed tomography (CT) device, and an X-ray device;
deriving anatomical information from at least one of the plurality of images;
deriving flow information relating to blood flow from the at least one of the plurality of images;
determining a resultant image in which the derived anatomical information and the derived flow information are combined, wherein
an intensity-dependent fenestration assigns gray-scale values to pixels of the resultant image in accordance with the derived anatomical information,
a time-dependent fenestration assigns chromaticities to the pixels in accordance with the derived flow information, wherein the time-dependent fenestration is performed such that at least one of (i) a maximum chromaticity luminance for the pixels is the same and (ii) a maximum color saturation for the pixels is the same, and
the gray-scale values and the chromaticities are assigned independently of one another; and
outputting the resultant image to a display device.

2. The method of claim 1, wherein the recording of at least a part of the plurality of images is contrast-medium supported.

3. The method of claim 1, wherein the anatomical information is derived in that a first projection is performed via a plurality of the images recorded at different times.

4. The method of claim 1, wherein the flow information is derived based on a physical model.

5. The method of claim 1, wherein at least one of gray scale for the intensity-dependent fenestration and color scale for the time-dependent fenestration is prespecifiable.

6. The method of claim 5, wherein a section of the output resultant image is graphically displayed on the display device and is selectable, wherein at least one of the gray scale and the color scale are dependent upon the section selected.

7. The method of claim 1, wherein:
each of the images are spatially three-dimensional images, wherein the anatomical information and the flow information are both embodied as spatially three-dimensional; and
the resultant image is a spatially two-dimensional image, wherein
the intensity-dependent fenestration is performed such that the gray-scale values are assigned to the pixels in accordance with the derived anatomical information projected along a spatial direction, and
the time-dependent fenestration is performed such that the chromaticities are assigned to the pixels in accordance with the derived flow information projected along the spatial direction.

8. A non-transitory computer readable medium comprising program code for performing the method of claim 1 when the program code is executed on a computer.

9. A non-transitory machine-readable data carrier, storing computer program code, for performing the method of claim 1 when the computer program code is executed on a computer.

10. An imaging device, comprising:
a computer to control the imaging device, wherein the imaging device comprises at least one of a magnetic resonance imaging (MRI) device, a computed tomography (CT) device, and an X-ray device, wherein, by sending commands to the imaging device, the computer causes the imaging device to at least,
record a plurality of images of a region under examination at different times;
derive anatomical information from at least one of the plurality of images;
derive flow information relating to blood flow from the at least one of the plurality of images;
determine a resultant image in which the derived anatomical information and the derived flow information are combined, wherein
an intensity-dependent fenestration assigns gray-scale values to pixels of the resultant image in accordance with the derived anatomical information,
a time-dependent fenestration assigns chromaticities to the pixels in accordance with the derived flow information, wherein the time-dependent fenestration is performed such that at least one of (i) a maximum chromaticity luminance for the pixels is the same and (ii) a maximum color saturation for the pixels is the same, and
the gray-scale values and the chromaticities are assigned independently of one another; and
output the resultant image to a display device.

11. The imaging device of claim 10, wherein:
at least one of gray scale for the intensity-dependent fenestration and color scale for the time-dependent fenestration is prespecifiable; and
a section of the output resultant image is graphically displayed on the display device and is selectable, wherein at least one of the gray scale and the color scale are dependent upon the section selected.

12. The imaging device of claim 10, wherein the recording of at least a part of the plurality of images is contrast-medium supported.

13. The imaging device of claim 10, wherein the anatomical information is derived in that a first projection is performed via a plurality of the images recorded at different times.

14. The imaging device of claim 10, wherein the flow information is derived based on a physical model.

15. The imaging device of claim 10, wherein:
each of the images are spatially three-dimensional images, wherein the anatomical information and the flow information are both embodied as spatially three-dimensional; and
the resultant image is a spatially two-dimensional image, wherein
the intensity-dependent fenestration is performed such that the gray-scale values are assigned to the pixels in accordance with the derived anatomical information projected along a spatial direction, and
the time-dependent fenestration is performed such that the chromaticities are assigned to the pixels in accordance with the derived flow information projected along the spatial direction.

* * * * *